(12) United States Patent
Nagata et al.

(10) Patent No.: US 6,313,432 B1
(45) Date of Patent: Nov. 6, 2001

(54) LASER CUTTING METHOD AND LASER CUTTER

(75) Inventors: Yozo Nagata; Masayuki Nagahori, both of Iruma-gun (JP)

(73) Assignee: Tanaka Engineering Works, Ltd., Iruma-Gun (JP)

(*) Notice: Subject to any disclaimer, the term of this patent is extended or adjusted under 35 U.S.C. 154(b) by 0 days.

(21) Appl. No.: 09/446,090

(22) PCT Filed: Jun. 22, 1998

(86) PCT No.: PCT/JP98/02763
§ 371 Date: Dec. 17, 1999
§ 102(e) Date: Dec. 17, 1999

(87) PCT Pub. No.: WO98/58760
PCT Pub. Date: Dec. 30, 1998

(30) Foreign Application Priority Data

Jun. 20, 1997 (JP) .................................................. 09-164781

(51) Int. Cl.[7] .............................. B23K 26/14; B23K 26/38
(52) U.S. Cl. .................................. 219/121.67; 219/121.72; 219/121.84
(58) Field of Search .................. 219/121.67, 121.68, 219/121.69, 121.7, 121.71, 212.72, 121.84

(56) References Cited

U.S. PATENT DOCUMENTS 5,770,833 * 6/1998 Kanaoka et al. ................ 219/121.67
6,118,097 * 9/2000 Kaga et al. ..................... 219/121.84

OTHER PUBLICATIONS

Japanese Patent Application, First Publication, No. Sho 59–87996, Ishikawajima–Harima, "Laser and Gas Cutter," May 21, 1984.
Japanese Patent Application, First Publication, No. Hei 5–228664, Showa Aluminum Corp., "Laser Cutting Method for Aluminum Material," Sep. 7, 1993.
Japanese Patent Application, First Publication, No. Hei 1–34579, Mitsubishi Heavy Industries, Ltd., "Method for Fusing Thick Plate," Feb. 6, 1989.

* cited by examiner

Primary Examiner—Samuel M. Heinrich
(74) Attorney, Agent, or Firm—Burns Doane Swecker & Mathis LLP (57) ABSTRACT

A development of a laser cutting method and a laser cutter in which the adverse effects such as self burning to the cutting surface can be prevented, when the material is cut at a high speed, has been desired. In order to achieve the object, the present invention provides a laser cutting method and a laser cutter in which a cutting laser beam 22 is applied to a material 25 to be cut at a cutting point 26, while ejecting gases 23 and 24 to the cutting point 26 or its surrounding area from a plurality of nozzle openings 30 and 31 arranged in a ring or in a line, wherein the oxygen concentrations of the gases 23 and 24 ejecting from at least one of the nozzle opening 30 and 31 are changed to adjust the oxygen concentration distribution in an area within several millimeters of the cutting point 26; thereby the cutting quality can be improved.

7 Claims, 8 Drawing Sheets

LASER CUTTING METHOD AND LASER CUTTER

TECHNICAL FIELD

The present invention relates to a laser cutting method and a laser cutter.

BACKGROUND ART

Figure 10:
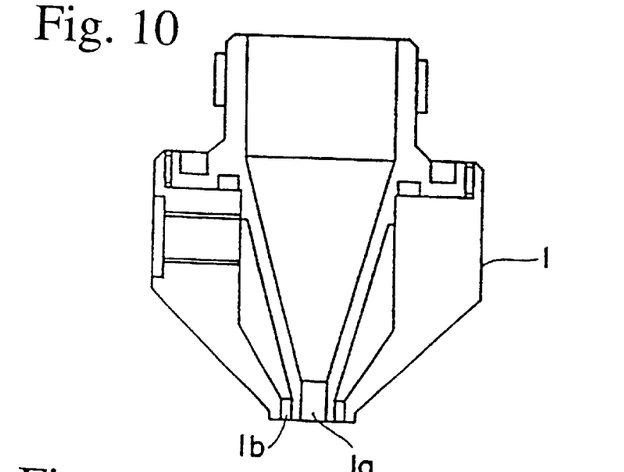
FIG. 10 is a sectional view showing the co-axial double nozzle.
Figure 11:
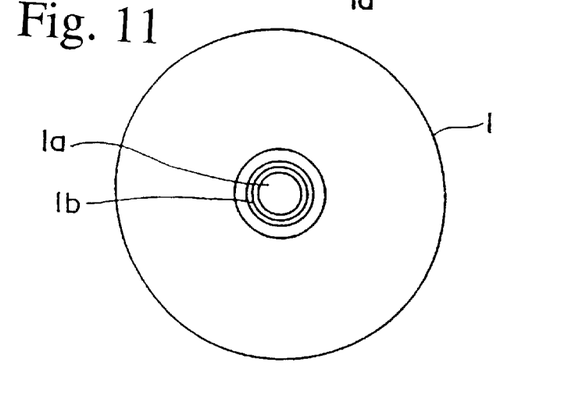
FIG. 11 is a bottom view showing the co-axial double nozzle shown in FIG. 10.
Figure 12:
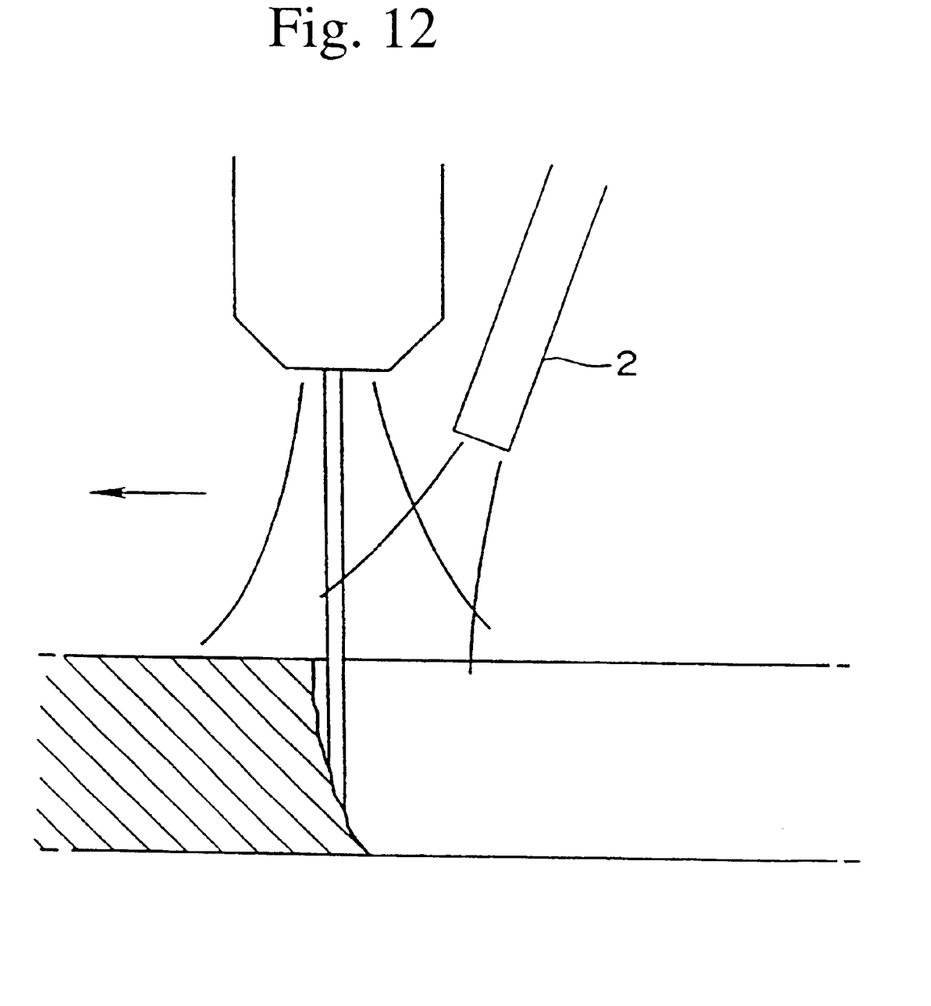
FIG. 12 shows the auxiliary nozzle.

When mild steel is cut with a laser having a small power relative to the thickness of the mild steel, sufficient cutting laser energy can be obtained at the vicinity of the surface of the mild steel at which the laser is applied. However, there are many cases in which sufficient cutting laser energy cannot arrive at the inside of the mild steel. Therefore, in recent years, high concentration (purity) oxygen (having a concentration (purity) of 99.5% or more) is supplied to the vicinity of the cutting point by use a co-axial double nozzle 1a and 1b as shown in FIGS. 10 and 11, a co-axial triple nozzle (not shown in Figures), or an auxiliary nozzle 2 as shown in FIG. 12. Thereby, a sufficient oxygen concentration for cutting the inside of the mild steel is maintained. Heat is generated due to the oxidation reaction between steel and the supplied oxygen, and the heat compensates for the deficiency of laser energy of the laser cutter.

In the laser cutting method using the co-axial double nozzle 1 or the auxiliary nozzle 2, only the oxygen quantity is adjusted, and the oxygen concentration is not adjusted. Therefore, it is difficult to maintain a suitable cutting quality when the thickness or the kinds of the material to be cut is changed. An excess combustion heat is generated due to the small change in conditions when the material is cut, and easily adversely effects to a quality of the cut surface.

Figure 13:
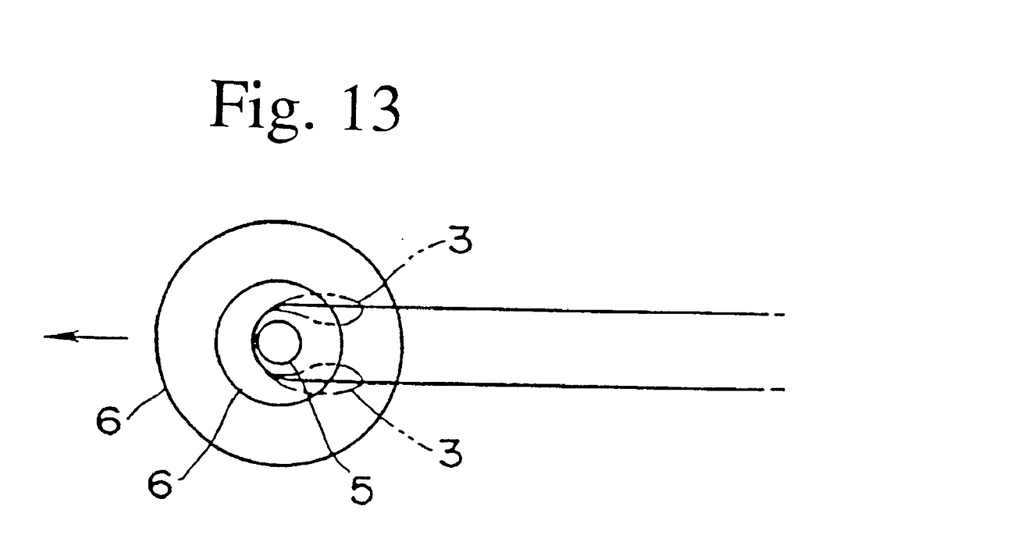
FIG. 13 shows the problems to be solved of the present invention, and is a plan view showing the vicinity of the cutting point when the co-axial double nozzle is used.
Figure 14:
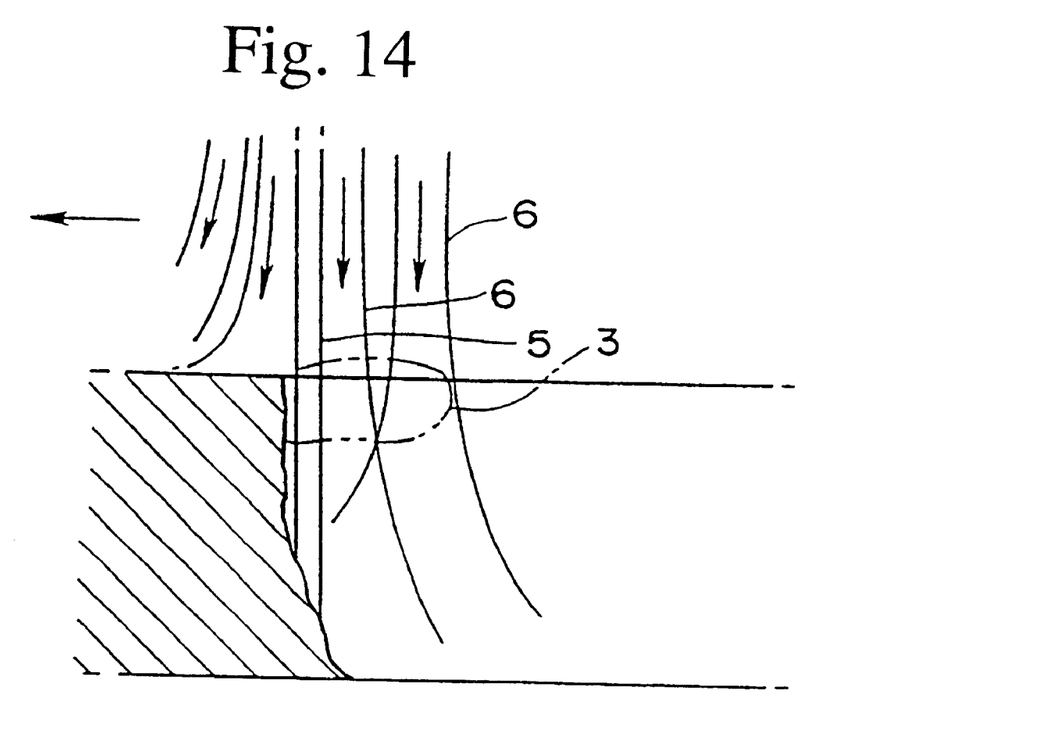
FIG. 14 is a sectional view showing the co-axial double nozzle shown in FIG. 13.
Figure 15:
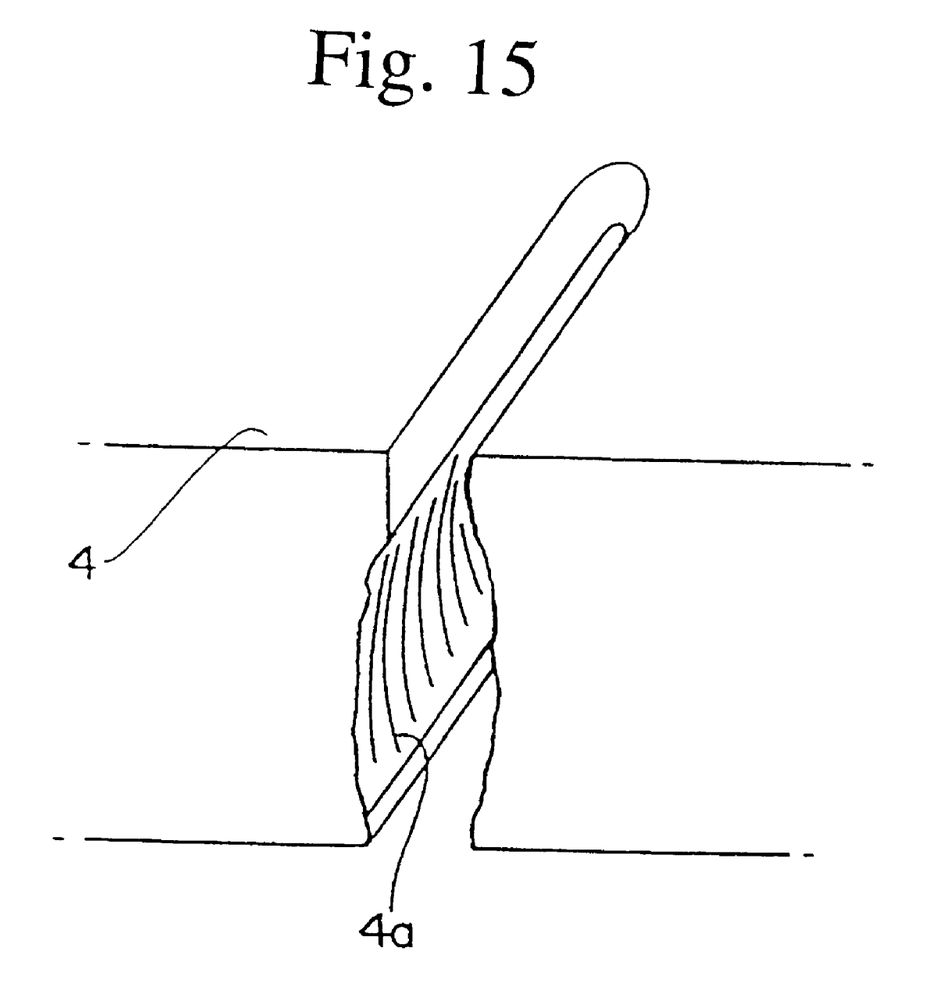
FIG. 15 shows the problems to be solved of the present invention, and is a perspective view showing the cutting surface formed by the conventional laser cutting method.

That is, when the mild steel is cut at a high speed (1.5 m/min or greater), a high temperature area 3 (represented by a two-dot dashed line in FIGS. 13 and 14) suitable for combustion between oxygen and steel is generated at the cutting surface behind the cutting point in a cutting direction, rather than the forward to the cutting point in a cutting direction by the influence of the heat conductivity and the thermal diffusivity, as shown in FIGS. 13 and 14. Then excess combustion energy adversely effects to the cutting surface and the cutting quality. Consequently, for example, as shown in FIG. 15, a normal cutting quality can be obtained at the vicinity of the surface 4 of the material to be cut; however, an abnormal cutting quality is often obtained on the inside of the material to be cut. In addition, a self burning phenomenon, dross adhesion, or cutting notch generation easily occurs on the inside of the material. Therefore, it is impossible to sufficiently improve the cutting quality. When the laser beam pulse is output continuously in order to cut the material at a high speed, the frequency of occurrence of the self burning phenomenon increases. Therefore, in order to prevent the occurrence of the self burning phenomenon, usually the laser beam pulse is intermittently output. However, when the laser beam pulse is intermittently output, the cutting speed decreases.

When the laser cutter applying a laser beam 5 and a cutting gas (high concentration oxygen) 6 and 6 from the same nozzle shown in FIGS. 13 and 14 is used, the cutting gas 6 and 6 diffuses more widely than the diameter of the laser beam 5. The gas stream of the cutting gas 6 consequently generates behind the cutting point in a cutting direction. When the diameter of the nozzle is set so as to equal the diameter of the laser beam, the combustion energy at the high temperature distributional area formed behind the cutting point in the cutting direction, increases due to oxygen. Therefore, it is impossible to solve the problem. The cutting quality depends on the position of the center of the laser beam 5. In order to adjust the proper diameter of the nozzle against laser beam diameter 5, it is necessary to frequently change the nozzle.

DISCLOSURE OF INVENTION

Therefore, the object of the present invention is to provide a laser cutting method having the following effects:

(a) the oxygen concentration distribution can be easily changed in an area within several millimeters of the cutting point by changing the oxygen concentration of the gas ejecting from a plurality of nozzles; thereby the cutting quality can be improved, (b) the adverse effects to the cutting surface such as self burning phenomenon, can be prevent by decreasing the oxygen concentration behind the cutting point in a cutting direction; thereby a high cutting quality can be obtained, and (c) these effects can be obtained; thereby a high cutting quality can be obtained even when the material is cut at a high speed.

In addition, the object of the present invention is to provide a laser cutter having the following effects:

(d) gas supplying means having an oxygen concentration changing function can respectively eject a gas containing a required amount of oxygen, and the oxygen concentration distribution can be easily changed in an area within several millimeters of the cutting point; thereby a high cutting quality can be easily obtained, and (e) an oxygen concentration distribution can be easily and exactly changed by a control device for controlling the mass flow rate of the ejecting gas; thereby the cutting quality can be improved.

The laser cutting method of the present invention comprises the step of applying a cutting laser beam to a material to be cut at a cutting point while ejecting gas to the cutting point or its surrounding area from a plurality of nozzles arranged in a ring or in a line, wherein the oxygen concentration of the gas ejecting from at least one of the nozzles is changed to adjust the oxygen concentration distribution in an area within several millimeters of the cutting point. It is possible to obtain an oxygen concentration suitable for laser cutting at the cutting point and another oxygen concentration suitable for preventing the disadvantages such as the self burning phenomenon in the area surrounding the cutting point; therefore, a high cutting quality can be obtained by the laser cutting method of the present invention.

Many oxygen concentration distributions can be obtained in the laser cutting method of the present invention. In order to obtain a high cutting quality, the most suitable oxygen concentration distribution is formed depending on the cutting conditions. Moreover, even while the material is being cut, it is possible to change the oxygen concentration distribution.

The oxygen concentration distribution preferably comprises a high oxygen concentration at the vicinity of the cutting point and a low oxygen concentration behind the cutting point in a cutting direction. The oxygen concentration distribution can be formed by ejecting the gas containing oxygen at a high concentration from the at least one nozzle, and ejecting the other gas containing oxygen at a low concentration. Thereby, the high oxygen concentration (having a concentration of 99.5% or more) suitable for a laser cutting can be maintained in the vicinity of the cutting point. Moreover, the other oxygen concentration suitable for preventing the combustion between oxygen and steel can be maintained behind the cutting point in a cutting direction, and the generation of the self burning phenomenon, dross adhesion, or the like can be prevented.

In order to prevent the generation of the self burning phenomenon and the like, it is preferable to set the oxygen concentration at the downstream in an ejecting direction of the gas stream low. However, it is more preferable to maintain the oxygen concentration ensuring the laser cutting at the downstream in the ejecting direction of the gas stream.

In addition, the laser cutting method of the present invention has the following effects:

(1) a high cutting quality can be obtained even when a laser beam comprising a continuous pulse is used; therefore, a cutting speed can be improved, (2) it is possible to adjust the variation of the cutting conditions such as a thickness of the material to be cut by changing the oxygen concentration or the flow rate of the gas containing oxygen at a low concentration and the gas containing oxygen at a high concentration; therefore, an exchanging the nozzle is not necessary and the cutting efficiency can be improved, and (3) a melting material generated at the cutting point can be easily removed; therefore, the cutting quality at the cutting point can be also improved.

The aforementioned "a plurality of nozzle openings" denotes a plurality of nozzle openings formed in one nozzle, a plurality of nozzle openings comprising a plurality of nozzles, a plurality of nozzle opening including auxiliary nozzle openings, and a plurality of nozzle openings assembled these nozzle openings. The nozzle may not eject the gas parallel to the laser beam. Some nozzles preferably eject the gas at an angle to the laser beam. When the nozzles eject the gas at an angle the laser beam, the required oxygen concentration can be easily adjusted. Moreover, it is more preferable to randomly arrange the nozzles each other so as to eject the gas to the different directions. Thereby, the required oxygen concentration can be more easily adjusted.

A laser cutter of the present invention comprises a plurality of nozzles arranged in a ring or in a line, and gas supplying means for supplying the gas to the nozzles and changing the oxygen concentration of the gas, wherein the oxygen concentration of the gas ejecting from the nozzles is changed by the gas supplying means. Therefore, the oxygen concentration distribution required in the laser cutting method of the present invention is easily adjusted. Moreover, when the cutting conditions such as the thickness of the material to be cut are changed, the required oxygen concentration distribution can be easily prepared by changing the gas quantity using the gas supplying means. Thereby, the cutting quality can be easily improved.

MODES FOR CARRYING OUT THE INVENTION

Hereinbelow, embodiments of the present invention will be explained in detail with reference to FIGS. 1 to 9.

Figure 1:
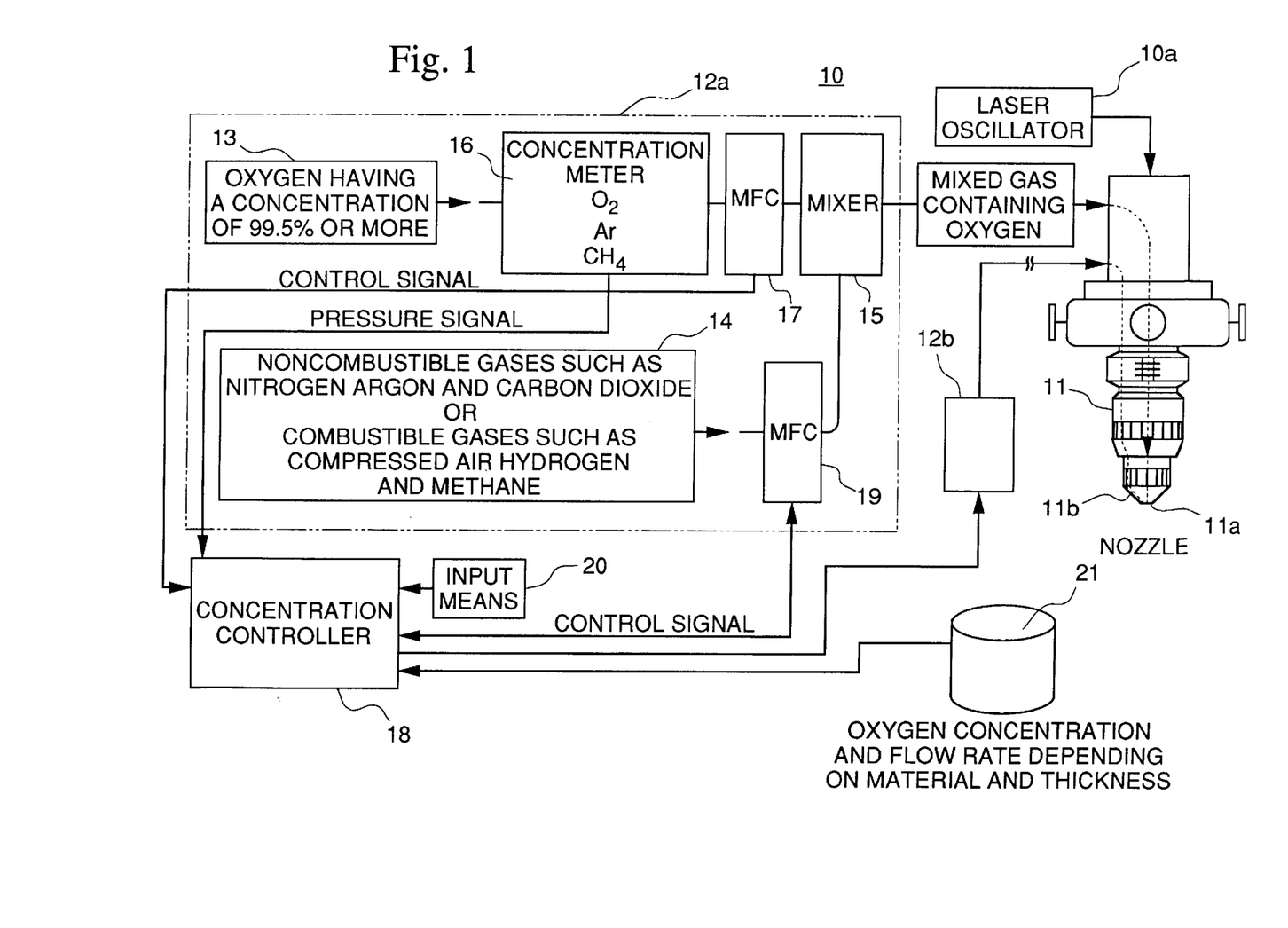
FIG. 1 shows the preferred laser cutter according to the present invention.

FIG. 1 shows one embodiment of the laser cutter 10 of the present invention.

The laser cutter 10 shown in FIG. 1 comprises a laser beam oscillator 10a, a nozzle 11, gas supplying means (a gas supplying apparatus) 12a and 12b for supplying gas to the nozzle 11. The nozzle 11 further comprises openings 11a and 11b. The gases supplied from the gas supplying means (gas supplying apparatuses) 12a and 12b eject from the openings 11a and 11b. That is, the nozzle 11 comprises the opening 11a for ejecting the gas supplied from the gas supplying means 12a and the other opening 11b for ejecting the gas supplied from the other gas supplying means 12b.

The high concentration oxygen having a concentration of 99.5% or more supplied from the oxygen resource 13 and a gas other than oxygen supplied from the gas resource 14 are mixed in the mixer 15. The mixer 15 supplies the obtained mixed gas containing the required amount of oxygen to the nozzle opening 11a. The oxygen supplied from the oxygen resource 13 flows into the mixer 15, via the concentration meter 16 and the mass flow controller (MFC) 17. The measuring signal obtained in the concentration meter 16 and the mass flow controller 17 is transmitted to the concentration controller 18. The mass flow rate of oxygen flowing into the mixer 15 is exactly calculated in the concentration controller 18. The mass flow controller 17 functions as a mass flow rate meter for oxygen, and controls the mass flow rate of oxygen flowing into the mixer 15.

The concentration controller 18 connects the mass flow controller 19 arranged in the gas passage between the gas resource 14 and the mixer 15, and outputs the driving signal to the mass flow controller 19; thereby, the concentration controller 18 controls the flow rate of the gas flowing into the mixer 15.

Moreover, many kinds of gas can be used as a gas supplied from the gas resource 14. For example, noncombustible gases such as nitrogen, argon, and carbon dioxide, and combustible gases such as compressed air, hydrogen, methane can be used. However, when compressed air is used, it is necessary to remove the impurities such as oil mist.

The concentration controller 18 connects the input means 20 and the data table 21. The cutting conditions such as a kind and a thickness of material to be cut, and a cutting speed are input to the concentration controller 18 by the input means 20. The data table 21 accumulates the optimum oxygen concentrations depending on these cutting conditions. The concentration controller 18 selects the optimum oxygen concentration from the data table 21 to adjust the inputs from the input means 20. Then the concentration controller 18 controls the mass flow controller 19 based on the inputs, and adjusts the oxygen concentration and the flow rate of the mixed gas supplied to the nozzle opening 11a from the mixer 15.

The other gas supplying means 12b connecting to the nozzle opening 11b comprises the same structure as the gas supplying means 12a, and supplies the mixed gas containing the required oxygen concentration at the required flow rate from the mixer 15 to the nozzle opening 11b. These gas supplying means 12a and 12b connect to the same concentration controller 18. The concentration controller 18 relatively adjusts the flow rate and the oxygen concentration of the mixed gases supplied from the gas supplying means 12a and 12b. The data table 21 accumulates also the data for relatively adjusting the flow rate and the oxygen concentration of the mixed gases supplied from the gas supplying means 12a and 12b.

Moreover, the laser cutter of this embodiment can comprise the nozzle comprising three or more openings, or three or more gas supplying means.

The oxygen resource 13 usually supplies the oxygen having a required concentration and no impurities; therefore, it is possible to omit the concentration meter 16. When the concentration meter 16 is omitted, the oxygen concentration of the oxygen supplying to the mass flow controller 17 is adjusted in the oxygen resource 13, depending on the cutting conditions.

Hereinbelow, embodiments of the laser cutting method according to the present invention will be explained in detail.

The first embodiment of the laser cutting method will be explained below.

Figure 2:
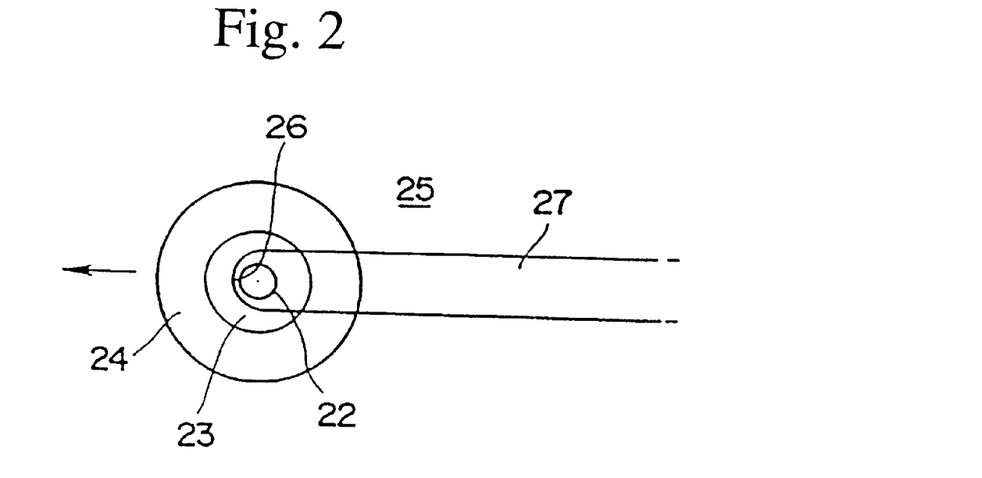
FIG. 2 shows the first preferred embodiment of the laser cutting method according to the present invention, and is a planar view showing the vicinity of the cutting point when the co-axial double nozzle is used.
Figure 6:
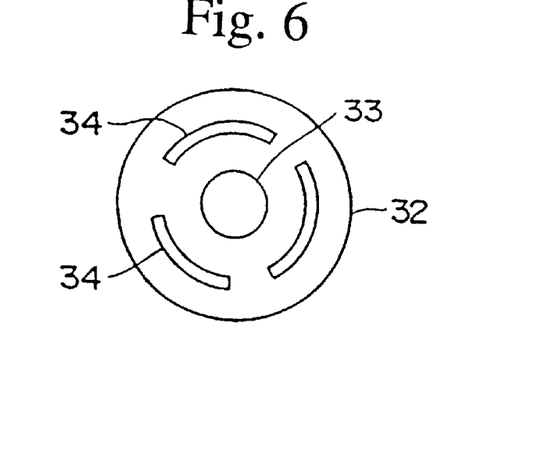
FIG. 6 shows the nozzle used in the first embodiment of the laser cutting method according to the present invention, and is a bottom view showing the nozzle comprising a center nozzle and a plurality of nozzles arranged in a ring so as to enclose the center nozzle.

FIG. 2 is a planar view showing the co-axial double nozzle, for example, shown in FIG. 6. In FIG. 2, reference numeral 22 denotes a laser beam, reference numeral 23 denotes a gas containing oxygen at a high concentration (a concentration of 99.5% or more), reference numeral 24 denotes a gas containing oxygen at a low concentration, and reference numeral 25 denotes a material to be cut (steel plate).

The diameter of the laser beam 22 is in a range from 0.1 to 0.5 mm. The gas steam of the high concentration oxygen 23 diffuses at the area within approximately 1.5 mm of the laser beam 22. Furthermore, the gas stream of a mixed gas 24 diffuses to the area surrounding the gas stream of the high concentration oxygen 23. The mixed gas 24 comprises oxygen and the gas other than oxygen such as nitrogen. The oxygen concentration of the mixed gas 24 is lower than that of the high concentration oxygen 23.

The high concentration oxygen 23 and the mixed gas 24 can be easily formed by the laser cutter 10 shown in FIG. 1. Moreover, the high concentration oxygen 23 and the mixed gas 24 respectively denote the gas containing oxygen at a high concentration and the gas containing oxygen at a low concentration in Claim 2.

Figure 3:
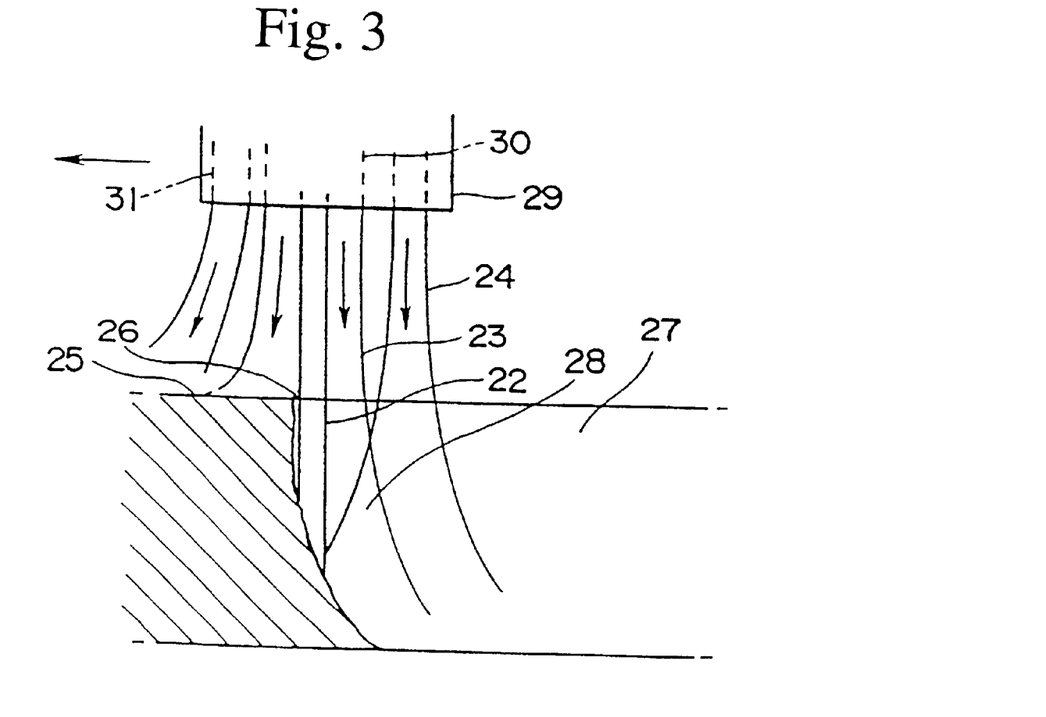
FIG. 3 is a sectional view of FIG. 2, and shows the oxygen concentration distribution prepared by the high concentration oxygen and the low concentration oxygen ejecting from the co-axial double nozzle.

FIG. 3 is a sectional view showing the oxygen concentration distribution at the vicinity of the cutting point 26 made by applying the laser beam 22 at the surface of the material 25 to be cut.

As shown in FIG. 3, the laser beam 22 straightly penetrates through the flat material 25 to be cut (steel plate). The gas stream of the high concentration oxygen 23 maintains the fixed diameter from the nozzle opening to the top surface of the material 25 to be cut; however, the gas stream of the high concentration oxygen 23 diffuses in the cut hole 27. The gas stream of the mixed gas 24 ejects parallel to the gas stream of the high concentration oxygen 23, flows into the cut hole 27, and diffuses to the center of the gas stream of the high concentration oxygen 23 at the bottom of the cut hole 27. The gas stream of the high concentration oxygen 23 and the gas stream of the mixed gas 24 are diffused and mixed at the bottom of the cut hole 27. Thereby, the intermediate oxygen concentration area 28 having an oxygen concentration intermediate between the oxygen concentration of the high concentration oxygen 23 and the mixed gas 24, is formed.

Moreover, in FIG. 3, reference numeral 29 denotes a nozzle comprising co-axial double nozzle openings 30 and 31. The high concentration oxygen 23 ejects from the inner nozzle opening 30. The mixed gas 24 ejects from the outer nozzle opening 31.

According to the cutting method of the first embodiment, the material is cut in the high concentration oxygen 23. The combustion energy for iron and oxygen decreases behind the cutting point in the moving direction of the laser beam 22 indicated by the an arrow in FIG. 3. Therefore, the generation of the self burning phenomenon, dross adhesion, or cutting notch can be prevented, and adverse effects to the cutting surface (wall of the cut hole 27) can be prevented. That is, the mixed gas 24 having a low oxygen concentration covers behind the high concentration oxygen 23 in a cutting direction, as shown in FIG. 2. Therefore, the combustion energy for steel and oxygen at the cutting surface significantly decreases, the adverse effects due to the excess combustion energy to the cutting surface can be prevented, and the smooth cutting surface can be obtained.

The oxygen concentration so as not to obstruct the cutting the material is maintained at the bottom of the cut hole 27 by the formation of the intermediate oxygen concentration area 28, as shown in FIG. 3. Therefore, the generation of the self burning phenomenon, dross adhesion, or cutting notch can be prevented. A smooth cutting surface having no abnormalities shown in FIG. 9, can be obtained.

The generation of the melting material at the cutting point 26 can be easily prevented and the cutting quality at the cutting point 26 is improved by preventing the adverse phenomena such as self burning behind the cutting point 26. When the material is cut by a laser beam comprising a continuous pulse at a high speed, the laser beam does not adversely influence to the cutting surface. Therefore, the cutting speed increases. In addition, even when the material is cut at a high speed, a high cutting quality can be obtained.

It is possible that the diameter of the laser beam 22 corresponds to the variation of the cutting conditions such as a thickness of the material to be cut by only changing the diameter of the gas stream of the high concentration oxygen 23 and the gas stream of the mixed gas 24, or the oxygen concentration of the mixed gas 24. Therefore, in order to adjust the diameter of the laser beam, exchanging the nozzle is not necessary. Thus, the cutting efficiency can be improved. When the laser cutter shown in FIG. 1 is used, the diameter of the gas streams can be easily adjusted by changing the mass flow rate of the high concentration oxygen 23 and the mixed gas 24. Therefore, the cutting efficiency can also be improved.

The laser cutter in which the gas having a required oxygen concentration directly supply to the nozzle openings 30 and 31 can also be used in the laser cutting method of this embodiment, in addition to the laser cutter 10 shown in FIG. 1.

Figure 4:
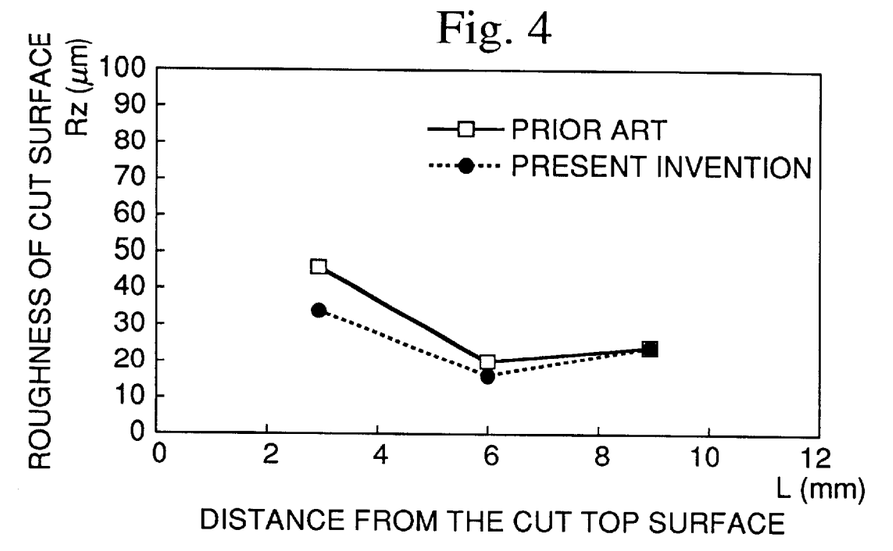
FIG. 4 shows the effects obtained from the first preferred embodiment of the laser cutting method according to the present invention, and shows the roughness of the cutting surface with respect to the distance from the top surface when mild steel having a thickness of 12 mm is cut.
Figure 5:
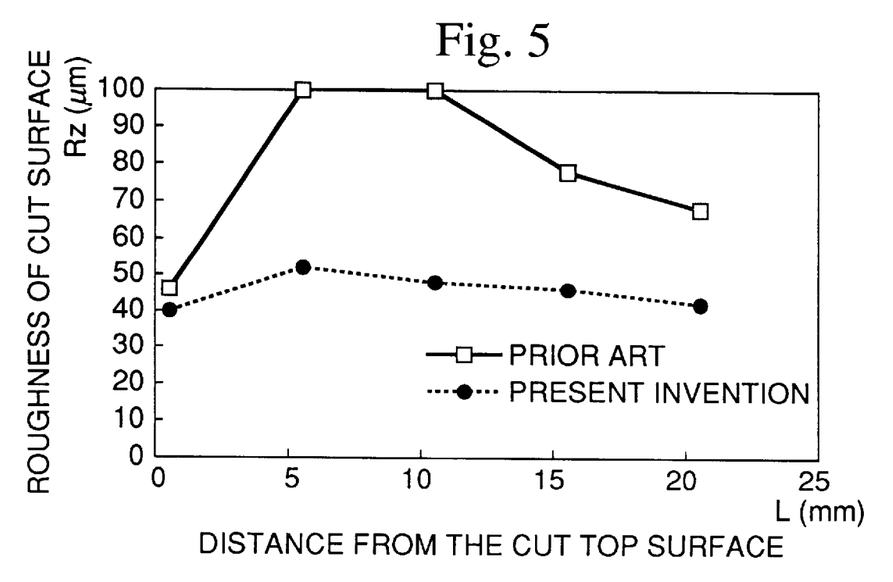
FIG. 5 shows the effects obtained from the first embodiment of the laser cutting method according to the present invention, and shows the roughness of the cutting surface with respect to the distance from the top surface when mild steel having a thickness of 22 mm is cut.

FIGS. 4 and 5 show the roughness Rz ($\mu$m) of the cutting surface when the laser cutting method of this embodiment according to the present invention and the conventional laser cutting method were performed under the same cutting conditions.

In FIG. 4, the laser beam output is 6 kW, the laser beam comprising a continuous pulse is used, the thickness of the material (steel plate: black mild steel) to be cut is 12 mm. In the laser cutting method (shown in FIG. 3) of this embodiment, the oxygen having an oxygen concentration of 99.8% is supplied from the inner nozzle opening 30, and the mixed gas having an oxygen concentration of 84.0% is supplied from the outer nozzle opening 31. In the conventional laser cutting method, oxygen having an oxygen concentration of 99.8% is supplied from the inner and outer nozzle openings 30 and 31.

The laser cutting conditions of FIG. 5 are the same as those of the laser cutting conditions of FIG. 4, except that the thickness of the material to be cut is 22 mm.

As shown in FIGS. 4 and 5, the roughness Rz of the cutting surface formed by the laser cutting method of this embodiment is smaller than the roughness Rz of the cutting surface formed by the conventional laser cutting method, in both cases in which the thickness of the material to be cut is 12 mm and 22 mm. As shown in FIG. 4, when the thickness of the material to be cut is 12 mm, the roughness Rz of the cutting surface at the point about 3 mm away from the top surface is remarkably improved. In addition, as shown in FIG. 5, when the thickness of the material to be cut is 22 mm, the roughness Rz at every point of the cutting surface is remarkably improved.

Therefore, the cutting quality is improved by forming the optimum oxygen concentration distribution in the cut hole in the laser cutting method of the present invention. The excellent effects which cannot be obtained by the conventional laser cutting method in which the mixed gases having a uniform oxygen concentration are ejected from the nozzle openings, can be obtained by the laser cutting method of the present invention.

Moreover, it is necessary that the ejecting conditions of the high concentration oxygen 23 and the mixed gas 24 correspond to the cutting conditions, in order to always obtain a high cutting quality.

The present inventor has proved that the oxygen concentration of the high concentration oxygen 23 supplied from the inner nozzle opening 30 is preferably 99.5% or more.

When the mild steel is cut under conditions in which the oxygen concentration of the high concentration oxygen is 99.5% or more, two kinds gas are used, that is, the high concentration oxygen and the mixed gas are used; a laser beam comprising a continuous pulse is used, the output of the laser beam is 6 kW, and the thickness of the mild steel is 9 mm, then the oxygen concentration of the mixed gas is preferably 70% or less. In this case, even when the oxygen concentration of the mixed gas is 0%, it is possible to prevent the adverse effects due to the excess combustion energy to the cutting surface; therefore, a higher cutting quality than the cutting quality obtained by the conventional laser cutting method can be obtained. For example, when the mild steel having a thickness in a range from 16 to 20 mm is cut under the above cutting conditions, the practical oxygen concentration of the mixed gas is 50% or more. When the mild steel is cut under cutting conditions in which the oxygen concentration of the mixed gas is less than 50%, significant the dross adhesion occurs and the cutting quality decreases. Therefore, such cutting conditions are not suitable for practical use. When the thickness of the mild steel is 15 mm or more and the oxygen concentration of the mixed gas is too small, the disadvantages such as significant dross adhesion often arises. However, it is possible to prevent the arising of the disadvantages by maintaining the lower limit of the oxygen concentration of the mixed gas at 50%. The higher limit of the oxygen concentration of the mixed gas is approximately 90%. When the higher limit of the oxygen concentration of the mixed gas is more than 90%, it is difficult to prevent these disadvantages from arising. When the thickness of the mild steel is 25 mm, the practical lower limit of the oxygen concentration of the mixed gas is 70%.

Many nozzles having a different structure can be used in the laser cutting method of this embodiment.

The high concentration oxygen 23 and the mixed gas 24 shown in FIGS. 2 and 3 can be obtained by using an auxiliary nozzle A plurality of auxiliary nozzles can be used.

FIG. 6 is a bottom view showing one nozzle.

The nozzle 32 shown in FIG. 6 comprises the center nozzle opening 33 and three outer nozzle openings 34 enclosing the center nozzle opening 33 in a ring line. The high concentration oxygen is ejected from the center nozzle opening 33, and the mixed gas having a low oxygen concentration is ejected from each the outer nozzle openings 34. When the nozzle 32 is used in the laser cutting method of the present invention, it is preferable to arrange one outer nozzle opening 34 in front of the cutting point in the cutting direction, and two other outer nozzle openings 34 and 34 behind the cutting point in the cutting direction. Thereby, the cutting quality can be improved more efficiently. That is, as shown in FIGS. 2 and 3, it is particularly important to decrease the oxygen concentration beside and behind the cutting point 26. The area in which the oxygen concentration is low can be formed by ejecting the mixed gas from the outer nozzle openings 34 and 34 arranged behind the cutting point in the cutting direction. When the nozzle 32 is used, it is possible to decrease reliably the oxygen concentration beside and behind the cutting point 26; therefore, the cutting quality can be reliably improved. In addition, the mixed gas ejected from the outer nozzle openings 34 does not entirely encircle the gas stream of the high concentration oxygen; therefore, the amount of the mixed gas used can be decreased The cost for laser cutting can decreases.

Moreover, this embodiment adopted a nozzle comprising three outer nozzle openings, but the nozzle is not restricted to 3 outer nozzle openings. It is also possible to arrange the outer nozzle openings so as to have a different opening shape around the center opening 33.

It is further possible to eject the gases having a different oxygen concentration from a plurality of the outer nozzle openings surrounding the center nozzle opening 33. Thereby, it is possible to efficiently adjust the oxygen concentration distribution around the cutting point; therefore, a high cutting quality can be obtained.

Hereinbelow, the second embodiment of the laser cutting method according to the present invention will be explained in detail with reference to FIGS. 7 and 8.

Figure 7:
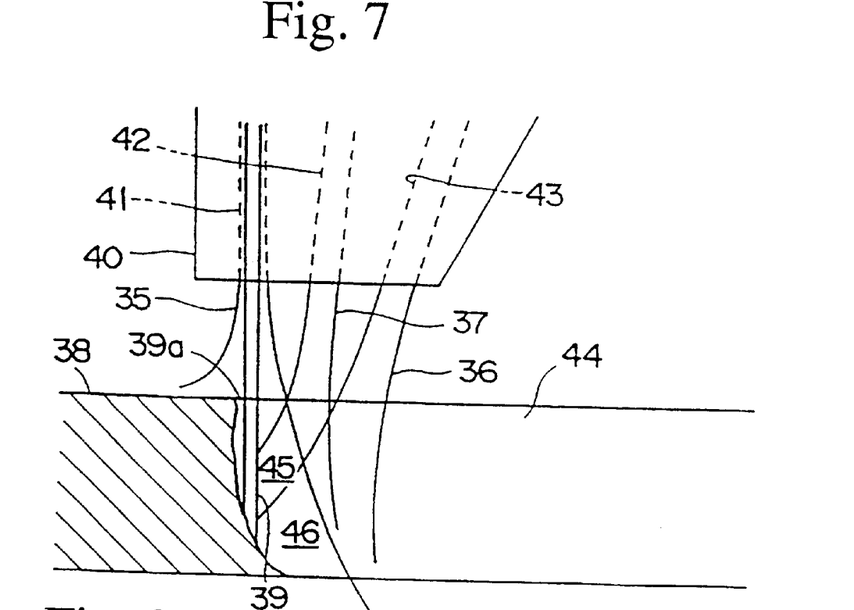
FIG. 7 shows the second embodiment of the laser cutting method according to the present invention, and is a sectional view showing the oxygen concentration distribution formed at the vicinity of the cutting point.
Figure 8:
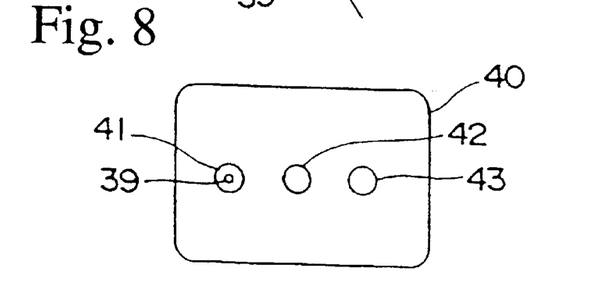
FIG. 8 shows the second embodiment of the laser cutting method according to the present invention, and is a bottom view showing the nozzle comprising three nozzle openings arranged in a line.
Figure 9:
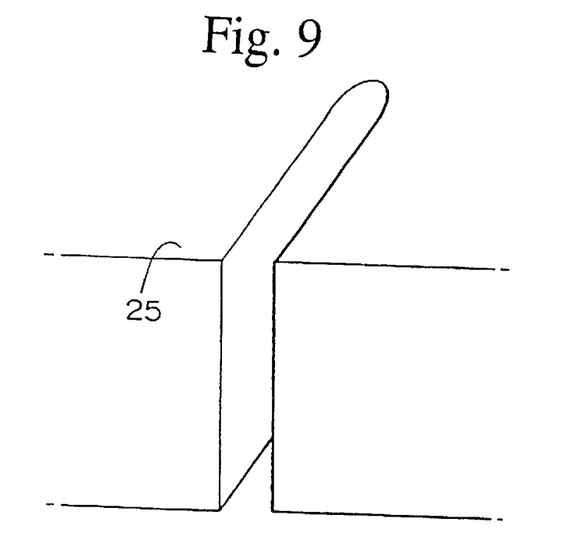
FIG. 9 shows the effects obtained from the laser cutting method of the present invention, and is a perspective view showing the cutting surface formed by the laser cutting method of the present invention.

As shown in FIG. 7, in this embodiment of the laser cutting method, two the gas streams 35 and 36 having a high oxygen concentration of 99.5% and the mixed gas stream 37 comprising oxygen and the gas other than oxygen such as nitrogen are ejected from the nozzle 40 to the vicinity of the cutting point 39a where the laser beam 39 is applied to the material 38 (steel plate) to be cut. As shown in FIGS. 7 and 8, the nozzle 40 comprises three nozzle openings 41, 42, and 43 arranged in a line. The high concentration oxygen is ejected from the nozzle opening 41 arranged in the front in the cutting direction and the nozzle opening 43 arranged in the rear in the cutting direction, and the mixed gas 37 is ejected from the center nozzle opening 42.

Moreover, the high concentration oxygen 35 and 36 and the mixed gas 37 respectively denote the gas containing oxygen at a high concentration and the gas containing oxygen at a low concentration in Claim 2.

The high concentration oxygen 35 and 36, and the mixed gas 37 are respectively ejected from the nozzle 40, and form the gas streams having a diameter of approximately 1.5 mm. The gas stream comprising the high concentration oxygen gas 35 ejected from the nozzle opening 41 arranged in the front of the cutting direction penetrates through the cut hole 44 formed in the material 38 to be cut, while the gas stream comprising the high concentration oxygen gas 35 encloses the laser beam 39. The mixed gas 37 forms the oblique gas stream ejecting behind the gas stream of the high concentration oxygen 35 in the cutting direction. The gas stream of the mixed gas 37 interflows with the gas stream comprising the high concentration oxygen 35 at the portion at which from the center to the bottom (bottom in FIG. 7) in the thickness direction of the material 38 to be cut in the cut hole 44. The high concentration oxygen 36 forms the oblique gas stream ejecting behind the gas stream of the mixed gas 37 in the cutting direction. The gas stream comprising the high concentration oxygen 36 interflows with the gas stream of high concentration oxygen 35 below the portion where the gas stream of the high concentration oxygen 35 and the gas stream of the mixed gas 37 interflow.

The required laser cutting can be performed in the high concentration gas 35 at the upside of the cut hole 44. Behind the cutting point 39a in the cutting direction, the combustion energy for iron and oxygen decreases due to the existence of the mixed gas 37. Therefore, the generation of self burning and dross adhesion can be prevented. Below the cutting point 39a in the thickness direction of the material 38 to be cut, the high concentration oxygen 35 and the mixed gas 37 are mixed, the intermediate oxygen concentration area 45 having an oxygen concentration between the oxygen concentration of the high concentration oxygen 35 and the mixed gas 37, is formed. The laser cutting can be performed in this area; but the adverse effects such as self burning can be prevented. Below the intermediate oxygen concentration area 45 in the thickness direction of the material 38 to be cut, the stable oxygen concentration area 46 is formed. The high concentration oxygen 35 and 36, and the mixed gas 37 diffuses, and are mixed; thereby the stable oxygen concentration area 46 is formed. The oxygen concentration at the stable oxygen concentration area 46 substantially equals to the oxygen concentration at the intermediate oxygen concentration area 45. Behind the intermediate oxygen concentration area 45 in the cutting direction, the oxygen concentration increases due to the high concentration oxygen 36. However, the intermediate oxygen concentration area 45 is separated from the cutting point 39a; therefore, the temperature at the intermediate oxygen concentration area 45 is low, and the combustion energy for iron and oxygen decreases. The adverse effects such as self burning do not occur.

Therefore, according to the laser cutting method of this embodiment it is possible to prevent adverse effects such as self burning while maintaining the cutting, due to the oxygen concentration distribution formed at the vicinity of the cutting point 39a. Consequently, the cutting quality can be improved. In addition, even when the thickness of the material to be cut is large, sufficient combustion energy for iron and oxygen can be maintained due to the stable oxygen concentration area 46 formed by the high concentration oxygen 37 below the intermediate oxygen concentration area 45. Therefore, a high cutting quality can be obtained.

Moreover, according to the laser cutting method of this embodiment, it is possible to easily adjust the position of the stable oxygen concentration area 46 and the combustion energy distribution in the direction of the thickness of the material to be cut by changing the flow rate of the high concentration oxygen 37. Even when the laser beam energy is small, the combustion energy at the stable oxygen concentration area 46 can be decreased by increasing the mass flow rate of the high concentration oxygen 37; therefore, excellent cutting properties can be maintained. In this case, the high concentration oxygen 37 does not influence to the original oxygen concentration of the cutting point 39a and the intermediate oxygen concentration area 45; therefore, the cutting property at the cutting point 39a and the intermediate oxygen concentration area 45 can be maintained. The combustion energy distribution can be easily adjusted, and the cutting quality can be easily improved. Moreover, the material 38 to be cut having a large thickness can be efficiently cut due to the spread of the stable oxygen concentration area 46 by increasing the mass flow rate of the high concentration oxygen 37.

The present invention is not limited to the embodiments explained above, but the structure of the nozzles in the embodiments can be variously modified within the scope of the claimed invention.

Moreover, according to the laser cutting method of the present invention, when the co-axial double nozzle is used, it is possible to eject the gas having a low oxygen concentration from the inner nozzle opening, and the gas having a high oxygen concentration from the outer nozzle opening.

What is claimed is:

1. A laser cutting method in which a cutting laser beam is applied to a material to be cut at a cutting point, while ejecting gas to the cutting point or its surrounding area from a plurality of nozzles arranged in a ring or in a line, wherein an oxygen concentration of the gas ejecting from at least one of the nozzles is changed to adjust the oxygen concentration distribution in an area within several millimeters of the cutting point.

2. A laser cutting method as claimed in claim 1, wherein a high oxygen concentration at the vicinity of the cutting point and a low oxygen concentration behind the cutting point in a cutting direction are maintained by ejecting a gas containing oxygen at a high concentration from at least one of the nozzles and ejecting a gas containing oxygen at a low concentration from the other nozzle.

3. A laser cutting method as claimed in claim 2, wherein the oxygen concentration of the gas containing oxygen at a high concentration is 99.5% or more, and the oxygen concentration of the gas containing oxygen at a low concentration is 90% or less.

4. A laser cutting method as claimed in claim 3, wherein the gas stream of the gas containing oxygen at a high concentration is formed around the laser beam having a diameter in a range from 0.1 to 0.5 mm, and the gas stream of the gas containing oxygen at a low concentration is formed around the gas stream of the gas containing oxygen at a high concentration.

5. A laser cutting method as claimed in claim 4, wherein the lower limit of the oxygen concentration of the mixed gas is maintained at 50%, when mild steel having a thickness of 15 mm or more is cut.

6. A laser cutter comprising a plurality of nozzle openings arranged in a line or in a ring, and gas supplying means for supplying gases to the nozzle openings and adjusting the oxygen concentration of the gases, wherein the gases ejecting from the nozzle openings can be respectively adjusted by the gas supplying means.

7. A laser cutter as claimed in claim 6, wherein the gas supplying means comprises a mass flow rate controller for controlling the mass flow rate of the oxygen.

* * * * *